UNITED STATES PATENT OFFICE 2,372,808

ESTERS OF POLY-β-CARBOXYALKYL ETHERS OF POLYHYDRIC ALCOHOLS

Herman A. Bruson, Philadelphia, Pa., assignor to The Resinous Products & Chemical Company, Philadelphia, Pa., a corporation of Delaware No Drawing. Application July 30, 1941, Serial No. 404,624

5 Claims. (Cl. 260—484)

This invention relates to esters of monohydric alcohols and poly-β-carboxyalkyl ethers of polyhydric alcohols. These new substances have the formula:

wherein A is the organic radical of a polyhydric alcohol having from 2 to 6 (inclusive) hydroxyl groups, R is the organic radical of a monohydric primary or secondary alcohol, $n$ is an integer from 2 to 6 inclusive, and $x$ is hydrogen or a methyl group.

These compounds are obtained according to this invention by condensing a monohydric primary or secondary alcohol in the presence of an aqueous mineral acid with a compound having the formula:

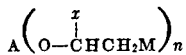

wherein A, $n$ and $x$ have the above-mentioned significance and M represents —CN or —CONH$_2$. These are obtainable, for example, by condensing at least two mols each of acrylonitrile, acrylamide, crotononitrile, allyl cyanide or crotonamide in the presence of alkaline condensing agents with polyhydric alcohols having 2 to 6 hydroxyl groups in the molecule in general accordance with the method described in co-pending application Serial No. 374,603, filed January 15, 1941.

In preparing the nitriles and amides there may be used any of the numerous polyhydric alcohols, the organic radical of which corresponds to A, such as the simple glycols, as for example, ethylene glycol, propylene glycol, butylene glycol, trimethylene glycol, tetramethylene glycol, pentamethylene glycol, hexamethylene glycol, decamethylene glycol, octadecandiol, and their homologues; or the polyalkylene glycols such as diethylene glycol, triethylene glycol, dipropylene glycol, thiodiethylene gycol, tetraethylene glycol, nonethylene glycol and higher homologues thereof; or polyhydric alcohols such as glycerol, glycerol monophenylether, glycerol monoxenylether, glycerol monomethyl ether, pentaerythrite, sorbitol, inositol, mannitol, polyglycerol, or cyclohexanediol. Any polyhydric alcohol of the aliphatic, arylaliphatic, or cycloaliphatic series can be used. These may be saturated or unsaturated in character and contain short chains or long chains of carbon atoms as, for example, occurs in the case of octadecandiol, or contain long chains interrupted by oxygen as in the case of the polyethylene glycols derived from polymerization of ethylene oxide.

Among the alkaline condensing agents which are effective for promoting the reaction between these polyhydric alcohols and the unsaturated nitriles or amides are oxides, hydroxides, hydrides, amides and alcoholates of the alkali metals, or the alkali metals themselves. There may also be used strongly basic non-metallic hydroxides such as the quaternary ammonium hydroxides. Of these a particularly effective condensing agent is the aqueous solution containing 40% of trimethyl benzyl ammonium hydroxide which is commercially available under the trade name "Triton B." The quantity of alkaline condensing agent required is relatively small, amounts of the order of 0.5% to 10% on the combined weight of the reactants usually being sufficient. One or several of these alkaline materials are suspended, or, preferably, dissolved in the reactive polyhydric alcohol itself or in a solution thereof in an inert liquid such as dioxane, ether, benzene, or in a liquid which is less reactive than the reacting components, such as water or tertiary butyl alcohol, and the unsaturated nitrile or amide added thereto. The condensation takes place readily at temperatures from about 0° to about 80° C., although initial temperatures of 25° C. to 60° C. are preferred. The condensation is usually exothermal so that cooling, at least during the initial part of the reaction, is generally advantageous in order to control the vigor of the reaction and to prevent undesired polymerization or side reactions.

After the reaction between polyhydric alcohol and unsaturated nitrile or amide has been completed, the condensation products

or

may be isolated and used in a crude form or they may be purified. If desired, the nitrile may be converted in a separate step to the amide, as by reaction with the equivalent amount of water in the presence of a strong inorganic acid or the nitrile may be reacted with water and alcohol in the presence of sufficient of a relatively stable mineral acid to form the ester of the alcohol directly. Similarly, the amide may be reacted with alcohol in the presence of a strong mineral acid to form an ester.

While the reactions to convert nitriles to amides are generally performed between room temperature and the boiling point of water, 60° C. to 100° C. being preferred, the conversion to esters is usually performed within the range of about 60° C. to about 150° C. The reactions may be accomplished under reflux with the removal of water, if desired. In this connection the use of an inert solvent such as benzene or toluene assists in the removal and separation of water. Also the reactions may be run under pressure, particularly for the preparation of esters of low-boiling alcohols.

Typical of the acids which may be used are hydrochloric, sulfuric, and phosphoric which are stable and non-oxidizing under the cnditions of the reaction. Of these acids sulfuric is to be preferred. In the presence of sulfuric acid, water and a monohydric alcohol react with the nitrile or amide groups to form —COOR groups in good yield without splitting ether linkages to any appreciable extent. The amount of inorganic acid used should be at least sufficient to bind the ammonia formed in the reaction.

Many of the resulting esters may be purified by distillation. Others, due to their high boiling points, cannot be distilled. These may be decolorized with bleaching clays or charcoal after the volatile impurities have been removed by distillation.

Among the monohydric alcohols which can be used in forming the esters the most suitable are those of the aliphatic type such as methanol, ethanol, propanol-1, isopropanol, butanol, β-ethoxyethanol, amyl alcohol, octyl alcohol, β-butoxyethanol, allyl alcohol, lauryl alcohol, cetyl alcohol, and the like. On the other hand, arylaliphatic, cycloaliphatic or heterocyclic alcohols are also suitable, such as phenoxyethanol, β-phenylethanol, cyclohexanol, or tetrahydrofurfuryl alcohol.

The products are high boiling liquids useful as plasticizers for synthetic resins such as cellulose nitrate, cellulose acetate, ethyl cellulose, polyvinyl chloride, polyvinyl acetals, phenolic formaldehyde resins, polyacrylates, polymethacrylates and other plastics.

The details of the present invention are illustrated by the following examples.

Example 1

C₄H₉OOC—CH₂CH₂OCH₂CH₂OCH₂CH₂OCH₂CH₂COOC₄H₉

To 106 g. of bis-(β-cyanoethyoxy)-diethyl ether there was added dropwise 125 g. of 78.4% sulfuric acid while the reaction mixture was stirred and maintained at 55–60° C. After the addition which required about two hours, the mixture was stirred at 60° C. for five hours longer. To the clear syrup thus obtained 296 g. of n-butanol-1 was added, and the mixture heated for nine hours at 90–95° C. It was then heated under a reflux condenser attached to a water trap, at 118–130° C. until 18.5 cc. of water had collected in the trap. The reaction mixture was cooled, filtered to remove ammonium acid sulfate and the filtrate washed thoroughly with water, then with dilute sodium carbonate solution and finally with water to remove all traces of acidity. The oil layer was separated, dried over sodium sulfate, filtered, and distilled under a good vacuum. The desired product (140 g.) distilled over between 175° and 195° C. at 1 mm. pressure. Upon redistillation it formed an almost colorless liquid, B. P. 190–195° C. /1 mm., having a saponification number 306 (theory 310) and possessing $N_D^{25}$ 1.4436; $d^{25}$ 1.0247.

The bis-(β-cyanoethoxy)-diethyl ether used is a colorless liquid, B. P. 185–195° C./1–2 mm., obtained by reacting 1 mol of diethylene glycol with 2 mols of acrylonitrile in the presence of aqueous sodium hydroxide as a catalyst at 10–20° C.

Example 2

Iso-C₃H₇OOC-CH₂CH₂OCH₂CH₂OCH₂CH₂OCH₂CH₂COOC₃H₇

To 106 g. of bis-(β-cyanoethoxy)-diethyl ether there was added dropwise 118 g. of 83% sulfuric acid while the reaction mixture was stirred and maintained at 58–65° C. After the addition, which required about 1⅓ hours, the mixture was stirred at 60° C. for five hours longer. There was then added 90 g. of isopropanol and 175 g. of toluene and the mixture was boiled under reflux for eight hours. The product was cooled to 15° C., filtered free from ammonium acid sulfate, washed thoroughly with water, dilute soda solution and finally with water, then dried and distilled to recover solvent. The residual oil upon fractionation in vacuo yielded the desired ester as a colorless oil boiling at 162–164° C./1 mm., having $N_D^{25}$ 1.4378; $d^{25}$ 1.0353.

Example 3

C₄H₉OOC—CH₂CH₂OCH₂CH(CH₃)—OCH₂CH₂COOC₄H₉

To 91 g. of bis-(β-cyanoethoxy)-propane-1,2 there was added dropwise 116 g. of 84.5% sulfuric acid while the reaction mixture was stirred and maintained at 26–30° C. After the addition, which required 20 minutes, the mixture was stirred at 25–30° C. for one hour longer. To the clear syrup thus obtained 222 g. of n-butanol-1 was added and the mixture boiled under a reflux condenser attached to a water trap for about four hours at 123–140° C. until 18 g. of water had collected in the trap. The reaction mixture was cooled, washed thoroughly with water, followed by soda solution, and finally with water. The oil layer upon distillation in vacuo gave 102 g. of the desired product as a very pale yellow oil boiling at 170–175° C./1 mm., having a saponification number 334 (theory 338).

The bis-(β-cyanoethoxy)-propane-1,2 used is a colorless liquid B. P. 165–168° C./2 mm., obtained by reacting 1 mol of propylene glycol with 2 mols of acrylonitrile in the presence of sodium methylate as a catalyst at 25–28° C.

Example 4

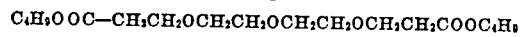
C₄H₉OOC—CH₂CH₂OCH(CH₃)CH₂OCH₂CH(CH₃)—OCH₂CH₂COOC₄H₉

To 120 g. of bis-(β-cyanoethoxy)-2,2'-dipropyl ether there was added dropwise 118 g. of 83% sulfuric acid while the reaction mixture was stirred and the temperature maintained at 60–70° C. After the addition, which required 1⅓ hours, the mixture was stirred at 60° C. for five hours. There was then added 92 g. of n-butanol-1 and 175 g. of toluene and the mixture boiled under reflux for 8½ hours at 105–115° C. The product was cooled, filtered, and the filtrate washed several times with cold water, followed by a dilute soda solution wash, and finally with water. The residual oil upon fractionation in vacuo yielded the desired ester (145 g.) as a pale yellow oil boiling at 197°–207° C./1 mm., having $N_D^{25}$ 1.4409; $d^{25}$ 1.0030.

The bis-(β-cyanoethoxy)-2,2'-dipropyl ether used is a colorless liquid, B. P. 185–195° C./1–2 mm., obtained by reacting 1 mol of dipropylene glycol with 2 mols of acrylonitrile in the presence of sodium methylate as a catalyst at 25–45° C.

Example 5

CH₃OCH₂CH₂COOCH₂CH(C₂H₅)—CH₂CH₂CH₂CH₃
|
CH₃OCH₂CH₂COOCH₂CH(C₂H₅)—CH₂CH₂CH₂CH₃

(a) To 84 g. of bis-(β-cyanoethoxy)-ethane-1,2 there was added dropwise 118 g. of 83% sulfuric acid while the reaction mixture was stirred and maintained at 60–70° C. After the addition which required two hours, the mixture was stirred at 60° C. for five hours. There was then added 163 g. of α-ethylhexanol and 175 g. of toluene and the mixture boiled under reflux for 10 hours at 117–125° C. The product was cooled, filtered and the filtrate washed with water, soda solution and finally with water. The residual oil, after drying, was distilled in vacuo. The desired ester (115 g.) came over at 227–233° C./0.5–1 mm. as a faintly yellow oil. Upon redistillation it came over at 210° C./1 mm. as a colorless oil, having $N_D^{25}$ 1.4481; $d^{25}$ 0.9639.

(b) By using 128 g. of α-ethyl butanol instead of the α-ethylhexanol in (a) above, the corresponding di-α-ethyl butyl ester, having the formula:

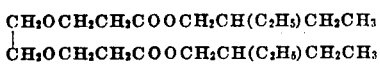

is obtained as an almost colorless oil (sap. number 302) boiling at 200–210° C./1 mm. The yield is 121 g. $N_D^{25}$ 1.4452; $d^{25}$ 0.9854.

(c) By using 95 g. of n-butanol-1 instead of the α-ethylhexanol in (a) above, the corresponding di-n-butyl ester having the formula:

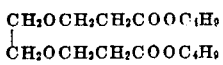

is obtained as a colorless oil, boiling at 205–210° C./11 mm. $N_D^{25}$ 1.4393; $d^{25}$ 1.0110.

(d) By using 163 g. of octanol-2 (capryl alcohol) instead of the α-ethylhexanol in (a) above, the corresponding di-sec-octyl ester is obtained having the formula:

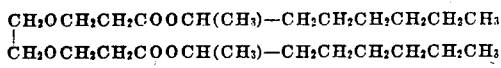

It is a colorless oil, B. P. 218–220° C./1 mm. having $N_D^{25}$ 1.4436; $d^{25}$ 0.9571.

(e) By using 125 g. of cyclohexanol instead of the α-ethylhexanol in (a) above the corresponding cyclohexyl ester is obtained, having the formula:

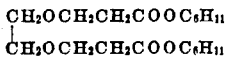

It is a colorless oil, B. P. 195–200° C./1 mm.

(f) By using 113 g. of glycol monoethyl ether instead of α-ethylhexanol in (a) above the corresponding ethoxyethyl ester having the formula:

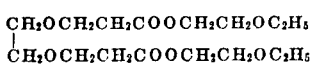

is obtained as a colorless oil, B. P. 185–190° C./1 mm., $N_D^{25}$ 1.4446; $d^{25}$ 1.0774.

The bis-(cyanoethoxy)-ethane-1,2 used above is a colorless liquid, B. P. 158° C./2 mm., obtained by reacting one mol of ethylene glycol with two mols of acrylonitrile in the presence of aqueous sodium hydroxide as a catalyst at 20–30° C.

*Example 6*

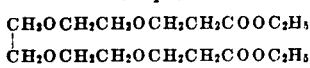

To 76.8 g. of bis-(β-cyanoethoxyethyl) ether of ethylene glycol there was added dropwise 71 g. of 83% sulfuric acid while the reaction temperature was maintained at 55–65° C. After the addition which required 1⅓ hours, the mixture was stirred at 60° C. for five hours. A mixture of 46 g. of ethanol and 175 g. of toluene was then added and the mixture was boiled under reflux for 10 hours. The product was cooled, washed thoroughly with water and soda solution and, after drying, distilled to remove the toluene. The residual oil boiled at 185–190° C./1 mm. and distilled as a pale yellow oil, the saponification number of which (326) agreed with the above formula. $N_D^{25}$ 1.4451; $d^{25}$ 1.0791.

The bis-(β-cyanoethoxyethyl) ether of ethylene glycol used is a colorless liquid, B. P. 220–230° C./1–2 mm., obtained by reacting one mol of triethylene glycol with two mols of acrylonitrile in the presence of aqueous sodium hydroxide as a catalyst at 20–30° C.

*Example 7*

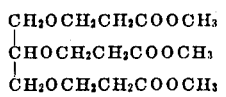

To 125 g. of tris-(β-cyanoethyl) ether of glycerol there was added dropwise 177 g. of 83% sulfuric acid while the reaction temperature was maintained at 60–70° C. After the addition which required 2¼ hours, the mixture was stirred at 60° C. for five hours. A mixture of 64 g. of methanol and 175 g. of toluene was then added, and the mixture was boiled under reflux for nine hours. The product was cooled and filtered. The filtrate was washed thoroughly with water and with soda solution and distilled to remove the toluene. The residual oil boiled at 200–210° C./1 mm. It was an almost colorless oil, $N_D^{25}$ 1.4486; $d^{25}$ 1.1517 having a saponification value 477. (Theory 481.)

The tris-(β-cyanoethyl) ether of glycerol used is a colorless liquid, B. P. 250–260° C./1–2 mm. obtained by reacting one mol of glycerol with three mols of acrylonitrile in the presence of aqueous sodium hydroxide as a catalyst at 20–30° C.

*Example 8*

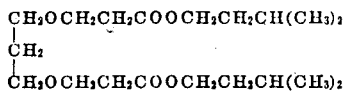

To 91 g. of bis-(β-cyanoethoxy)-propane-1,3 there was added dropwise with stirring 118 g. of 83% sulfuric acid during a two-hour period while the reaction mixture was maintained at 60° C. After the addition which required two hours, the mixture was stirred five hours longer at 60° C. A mixture of 110 g. of isobutyl carbinol and 175 g. of toluene was then added and the mixture was boiled under reflux for nine hours. The product was cooled, washed thoroughly with water and with soda solution and, after washing out all the alkali, distilled to remove the toluene. The residual oil upon distillation in vacuo at 1 mm. came over at 182–192° C. (mostly at 182–185° C.) was a colorless oil, having a saponification value 315 (theory 312); $N_D^{25}$ 1.4414; $d^{25}$ 0.9861.

The bis-(β-cyanoethoxy)-propane-1,3 used is a colorless liquid, B. P. 165–170° C./1–2 mm., obtained by reacting one mol of trimethylene glycol with two mols of acrylonitrile in the presence of aqueous sodium hydroxide as a catalyst at 20–30° C.

*Example 9*

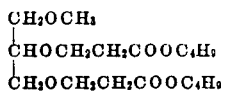

To 106 g. of 2,3-bis-(β-cyanoethoxy)-1-methoxy-propane there was added dropwise with stirring 118 g. of 83% sulfuric acid during a two-hour period while the reaction temperature was maintained at 65° C. The mixture was then heated for five hours longer at 65° C. To this was now added a mixture of 93 g. of n-butanol-1 and 175 g. of toluene, and the mixture boiled under reflux for ten hours. The product was cooled, washed thoroughly with water, dilute soda solution and finally with water; it was then dried and distilled. The desired ester (123 g.) came over at 190–195° C./1 mm. as a colorless oil, having a saponification value 309 (theory 311); $N_D^{25}$ 1.4413; $d^{25}$ 1.0217.

The 2,3-bis-(β-cyanoethoxy)-1-methoxy-propane used is a colorless liquid, B. P. 190–198° C./1–2 mm., obtained by condensing two mols of acrylonitrile in the presence of dilute sodium hydroxide solution as a catalyst with one mol of glyceryl-α-methyl ether.

Example 10

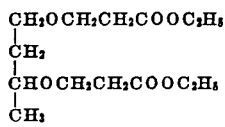

To 76 g. of bis-(β-cyanoethoxy)-butane-1,3 there was added dropwise while the mixture was stirred 95 g. of 83% sulfuric acid during a two-hour period. The reaction temperature was maintained at 55–60° C. This mixture was then heated for five hours longer at 60° C. and finally boiled with a mixture of 56 g. of ethanol and 150 g. of toluene for 10 hours under reflux. The cooled reaction product was washed thoroughly with water, followed by a dilute soda wash and then a water wash. The dried liquid upon distillation yielded 65 g. of the desired ester boiling at 145–150° C./1 mm. as a colorless oil having a saponification value 382 (theory 387); $N_D^{25}$ 1.4358; $d^{25}$ 1.0294.

The bis-(β-cyanoethoxy)-butane-1,3 used is a colorless liquid, B. P. 170–175° C./1 mm., obtained by reacting two mols of acrylonitrile and one mol of butylene glycol-1,3 in the presence of dilute sodium hydroxide as a catalyst.

Example 11

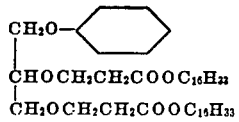

To 137 g. of 2,3-bis-(β-cyanoethoxy)-1-phenoxy propane there was added dropwise while the mixture was stirred 118 g. of 83% sulfuric acid during a two-hour period while the reaction mixture was maintained at 60° C. The mixture was then heated for five hours longer at 60–65° C. To this was now added 250 g. of cetyl alcohol and 300 g. of toluene and the mixture boiled under reflux for ten hours. The product was cooled and filtered; the filtrate was washed thoroughly with water, followed by a dilute soda wash, and finally by another water wash. The solvent was then removed by distillation under reduced pressure and the residual oil heated in high vacuo to 225° C. (1 mm.) to remove any volatile impurities. The residual oil consisting essentially of the di-cetyl ester of bis-(β-carboxy-ethyl)-1-phenoxy-propane was a pale yellow oil.

The 2,3-bis-(β-cyanoethoxy)-1-phenoxy-propane used is a colorless oil, B. P. 235–250° C./1 mm., obtained by reacting two mols of acrylonitrile with one mol of glyceryl-α-phenyl ether in the presence of sodium methoxide as a catalyst at 20–30° C.

Example 12

To 81 g. of tetra-(β-cyanoethoxy)-tetramethyl methane there was added dropwise while the mixture was stirred 109 grams of 83% sulfuric acid during one hour. The reaction temperature was maintained at 60° C. during the addition. The mixture was then heated for five hours longer at 60° C. To it was added 93 g. of n-butanol-1 and 175 g. of toluene and the mixture boiled under reflux for nine hours. The product was cooled, the oil separated and washed thoroughly with water followed by a dilute soda wash and finally another water wash. The solvent and butanol were then removed by heating under reduced pressure at 90–100° C. The residue was a pale amber-colored oil weighing 127 g. corresponding to the tetra-butyl ester having the formula:

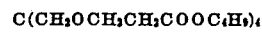

Due to its high boiling point, it cannot be distilled in vacuo at 1 mm. without decomposition.

The tetra-(β-cyanoethoxy)-tetramethyl methane used is a colorless liquid obtained by condensing pentaerythrite in aqueous solution containing a little sodium hydroxide with an excess of acrylonitrile at 10–20° C.

Example 13

A mixture consisting of 87 g. of ethylene glycol, 500 g. of tertiary butanol, 40 g. of aqueous 40% trimethyl benzyl ammonium hydroxide and 200 g. of acrylamide was stirred and heated at 45–50° C. for eight hours. The mixture was cooled and allowed to stand for 24 hours whereupon it solidified to a white crystalline mass. The crystals were filtered off and washed with acetone. The yield was 260 g. Upon recrystallization from dioxane, the product separated in colorless crystals melting at 123–124° C., having the formula:

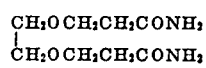

One mol equivalent of the above compound was mixed with two mol equivalents of 83% sulfuric acid and three mol equivalents of N-butanol in an equal volume of toluene. The mixture was boiled under reflux for nine hours, then cooled, washed thoroughly with water, dilute soda and again with water; then dried and distilled. The desired di-butyl ester identical with that described in Example 5(c) was obtained.

Example 14

A mixture consisting of 148 g. of diethylene glycol, 40 g. of aqueous 40% trimethyl benzyl ammonium hydroxide, 500 g. of tertiary butanol and 200 g. of acrylamide was heated for eight hours at 45–50° C. The mixture was neutralized with dilute hydrochloric acid and allowed to stand. The partially crystalline mixture was evaporated to dryness under reduced pressure on a steam bath and the syrupy residue stirred with acetone. The crystalline insoluble material was filtered off and recrystallized from dioxane. It formed colorless crystals melting at 103–4° C., having the formula:

$$CH_2OCH_2CH_2CONH_2$$
$$|$$
$$CH_2$$
$$|$$
$$O$$
$$|$$
$$CH_2$$
$$|$$
$$CH_2OCH_2CH_2CONH_2$$

One mol equivalent of this substance was mixed with two mol equivalents of 83% sulfuric acid and 3.5 mol equivalents of n-butanol in an equal volume of toluene. The mixture was boiled nine hours under reflux, then cooled, washed thoroughly with water, soda solution and finally with water. Upon distillation the di-butyl ester identical with that described in Example 1 was obtained as a colorless oil, B. P. 190–195° C./1 mm.

*Example 15*

To 100 g. of hexa-(β-cyanoethoxy)-hexane there was added dropwise a mixture of 120 g. of 98% sulfuric acid and 22 g. of water at 55–60° C. with stirring. The mixture was heated five hours longer at 60° C. To this was added 148 g. of n-butanol and 175 g. of toluene and the mixture boiled under reflux for nine hours. After cooling, separating the oil and washing it thoroughly with water, dilute soda solution and finally with water, it was evaporated to dryness under reduced pressure at 100° C. The residual oil, weighing 167 g., consisted essentially of the hexa-butyl ester, having the formula $$CH_2OCH_2CH_2COOC_4H_9$$
$$(CHOCH_2CH_2COOC_4H_9)_4$$
$$CH_2OCH_2CH_2COOC_4H_9$$

It was an amber-colored syrup which boiled too high to be distilled in vacuo without decomposition.

The hexa-(β-cyanoethoxy)-hexane is a colorless liquid obtained by reacting one mol of sorbitol or mannitol with at least six mols of acrylonitrile in dilute (1%) aqueous sodium hydroxide solution at 20–30° C.

*Example 16*

To one mol equivalent of bis-(β-cyano-isopropoxy)-ethane-1,2 there was added at 60° C. a mixture of two mols of 98% sulfuric acid and two mols of water. The mixture was heated six hours at 60° C., then mixed with 2.5 mols of n-decanol and an equal volume of toluene. The mixture was boiled ten hours under reflux, then cooled and thoroughly washed with water, soda solution and finally with water. The toluene and excess decanol were removed by distillation under reduced pressure up to 200° C./1 mm. The residual amber-colored oil consisted essentially of the didecyl ester, having the formula:

$$CH_2OCH(CH_3)-CH_2COOC_{10}H_{21}$$
$$|$$
$$CH_2OCH(CH_3)-CH_2COOC_{10}H_{21}$$

The bis-(β-cyano-isopropoxy)-ethane-1,2 used above is a colorless liquid, B. P. 197° C./11 mm. obtained by reacting one mol of ethylene glycol and two mols of allyl cyanide or crotononitrile at 40° C. in the presence of 10% by weight of aqueous 40% trimethyl benzyl ammonium hydroxide as a catalyst.

I claim:

1. As a new compound, an ester having the formula:

$$CH_2OCH_2CH_2COO-Butyl(n)$$
$$|$$
$$CH_2OCH_2CH_2COO-Butyl(n)$$

2. As a new compound, an ester having the formula:

$$CH_2OCH_2CH_2COO-Butyl(n)$$
$$|$$
$$CH_2$$
$$|$$
$$O$$
$$|$$
$$CH_2$$
$$|$$
$$CH_2OCH_2CH_2COO-Butyl(n)$$

3. As a new compound, an ester having the formula $$ROOCCH_2CH_2-O-A-O-CH_2CH_2COOR$$

wherein A is the organic radical of a polyalkylene glycol, the alkylene groups of which contain a chain of at least two carbon atoms, and R is the saturated hydrocarbon radical of a monohydric alcohol selected from a member of the class consisting of primary and secondary monohydric alcohols.

4. As a new compound, an ester having the formula $$ROOCCH_2CH_2(OCH_2CH_2)_n-OCH_2CH_2COOR$$

wherein $n$ is an integer from one to nine inclusive and R is the saturated hydrocarbon radical of a monohydric alcohol selected from a member of the class consisting of primary and secondary monohydric alcohols.

5. As a new compound, an ester having the formula $$Butyl-OOCCH_2CH_2(OCH_2CH_2)_n-OCH_2CH_2COO-Butyl$$

wherein $n$ is an integer from one to nine inclusive.

HERMAN A. BRUSON.